April 2, 1968            J. FORD            3,375,561

MANUFACTURE OF NEEDLED AND NON-WOVEN FELTS FOR
USE IN THE PAPERMAKING AND ANALOGOUS TRADES

Filed March 21, 1966            3 Sheets-Sheet 1

INVENTOR
JOHN FORD
BY Norris & Bateman
Attys

April 2, 1968    J. FORD    3,375,561
MANUFACTURE OF NEEDLED AND NON-WOVEN FELTS FOR
USE IN THE PAPERMAKING AND ANALOGOUS TRADES
Filed March 21, 1966    3 Sheets-Sheet 2

INVENTOR
JOHN FORD
BY Norris & Bateman
attys.

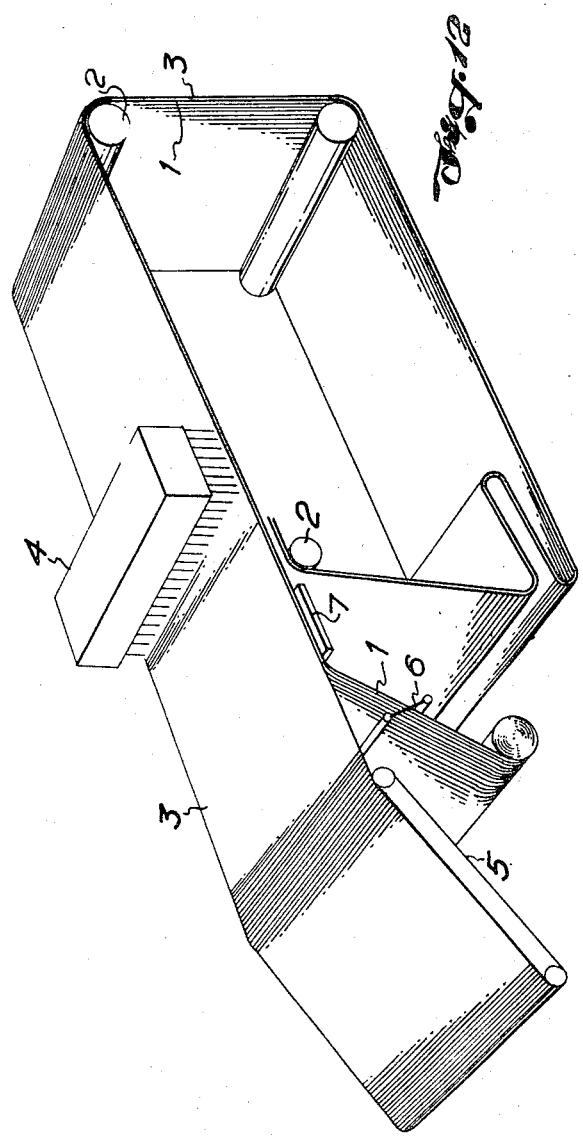

United States Patent Office 3,375,561
Patented Apr. 2, 1968

3,375,561
MANUFACTURE OF NEEDLED AND NON-WOVEN FELTS FOR USE IN THE PAPERMAKING AND ANALOGOUS TRADES
John Ford, 900 Walmersley Road, Bury, England
Filed Mar. 21, 1966, Ser. No. 535,952
Claims priority, application Great Britain, Mar. 23, 1965, 12,208/65
8 Claims. (Cl. 28—72.2)

ABSTRACT OF THE DISCLOSURE

A method of manufacturing an endless papermaking or like felt comprises feeding a warp and an unwoven fibre web to a needling loom, needling the warp and web into a predetermined length of one or more layers of the warp to form a non-woven neeedled fabric the required circumference of the felt, reintroducing the leading end of the needled fabric either above or under the trailing warp layers into the needling loom to produce a further layer or layers of warp on the felt, and severing the trailing end or ends of the warp layers when the required strength is achieved.

---

This invention relates to improvements in the manufacture of needled and non-woven felts for use in the papermaking and analogous trades.

Woven felts for use in the production of paper, board and asbestos cement and similar products have been proposed woven endless or spliced to become endless belt which conveys the pulp, board or asbestos cement slurry through the machine at the same time allowing water to be removed by suction, pressure or heat.

More recently felts have been needled either by needling a batt or web of fibres onto a woven fabric or by teazling a nap onto the woven felt and then needling this nap back into the structure. In some instances such felts have the disadvantage of carrying or withholding more water than is desirable owing to their bulk.

A method for the manufacture of a multi-ply felt has also been proposed which consists in teazling or otherwise raising the surface of each of a plurality of woven fabrics to form a nap on one or both surfaces thereof, assembling the teazled fabrics in juxtaposition surface to surface and subjecting the composite assembly to a needling operation so that the nap-composing fibres are secured at points intermediate of their length to the layer from which they have been raised and to the layers assembled therewith.

The object of the present invention is to produce a less bulky needled felt and to produce such a felt more economically by virtue of its being non-woven.

The invention consists of a method for the production of a non-woven endless felt comprising feeding a warp and a web to a needling loom needling the web into a preselected length of the warp to provide an unwoven needled fabric and required circumference of the felt, reintroducing the leading end of the needled fabric and the trailing warp to the needling loom to produce a second layer of warp on the felt and severing the trailing end of the warp when the required strength is achieved.

The invention will be described with reference to the accompanying drawings:

FIG. 12 is a respective view of the apparatus shown in FIG. 1 for applying a web to the warp.

Figure 1:
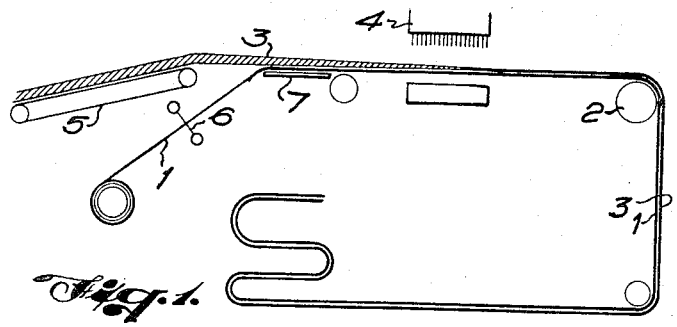
FIG. 1 is a diagrammatic view showing the first stage of the production of a two layer felt.

The method is carried out on a known fibre-locker or needle loom into which is fed a warp onto which is laid a batt or web, the fibres of which lie substantially at right angles to the warp. The needling operation attaches the web to the warp and in one needling operation produces a fabric which is self-supporting. When the desired endless circumferential length of the felt is needled as above described the leading end of the needled fabric is reintroduced either over or under the same warp thus producing an endless structure. The action may be continued indefinitely to give as many circumferences of the warp according to the strength required and when this stage is reached the ingoing warp is cut across. It will be understood that the needling attached the layers to each other in addition to attaching the warp to the web.

An endless felt is constructed from a warp of natural or man made fibres, filament or textured yarn or tow formed into a sheet the width of the required felt, fed into a needling machine together with the web of carded fibres and the whole needled together, the web being preferably of strong man-made fibres laid upon the whole of the warp or upon only one circumference.

A warp 1 as hereinbefore defined, a portion of which may be crimped is fed from a beam roll or creel to a needle loom comprising a series of rollers 2 over which the warp is drawn. The warp threads may be equally spaced by threading the ends through a reed 6. A web 3 of carded fibres or tow is fed on to the warp as it passes over a table 7 from a conveyor belt 5 and needles by a needle loom 4 into the warp to produce a self supporting structure of a predetermined length.

Figure 2:
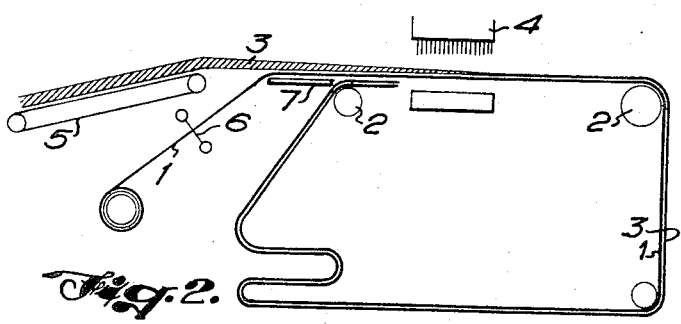
FIG. 2 is a similar view showing the start of the second stage for applying the second layer of warp and batt or web above the first layer.
Figure 7:
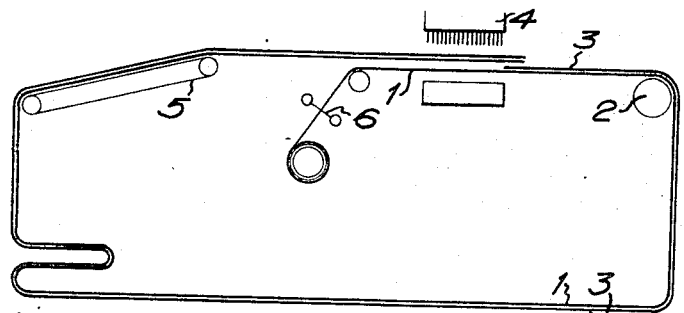
FIG. 7 is a similar view to FIG. 2 where the second layer or warp is applied under the first layer.
Figure 11:
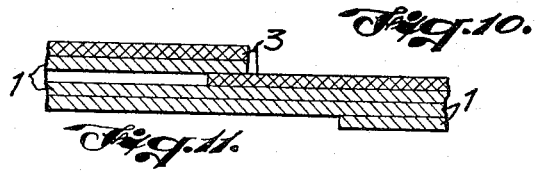

A continuous second layer of warp is applied over (FIG. 2) or under (FIG. 7) the first layer and needled thereinto with or without a second layer of the web according to the thickness or weight of the felt required with a reduced additional thickness of the end joint over that of a single layer felt. The overlap or joint may be cut on the bias and with a multilayer felt the ends may be gapped as shown in FIG. 11 to further reduce the thickness of the joint. By forming the carded web of nylon or Terylene (trademark) a sufficient cross wise strength is given to the felt to withstand the strains to which it may be subjected in use of a paper or like machine.

Two dissimilar warps may be employed one being crimped. One warp may be a continuous filament spun yarn or preferably uncrimped tow giving strength and lengthwise stability to the felt. The second warp may be made from crimped tow. Several layers may be used. The crimped tow is capable of accepting the deformation caused by the needling and gives substance and stability to the fabric.

Figure 3:
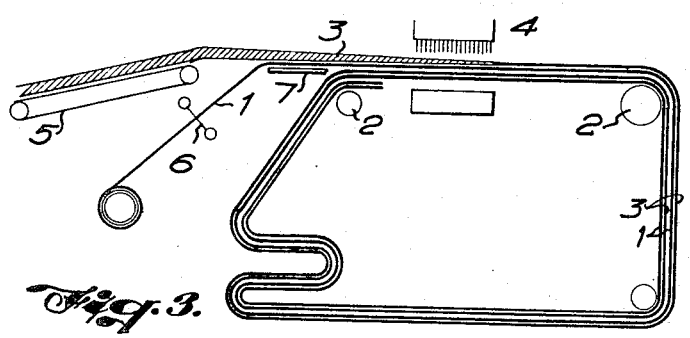
FIG. 3 is a similar view showing the end of the second stage before severing the warp, batt or web or the start of a third layer for the production of a thicker felt, the two layers being shown separately for clearness instead of being combined by the needling.
Figure 4:
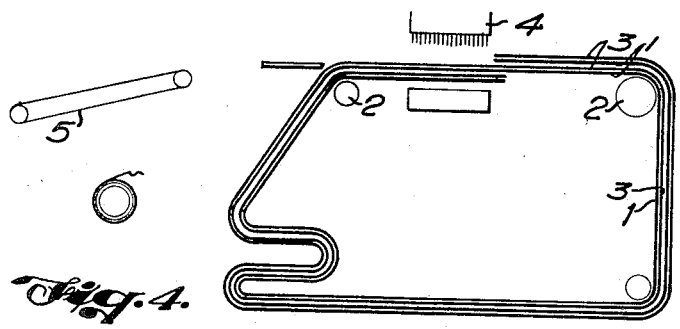
FIG. 4 is a similar view after severing the trailing end of the warp and batt or web.
Figure 5:
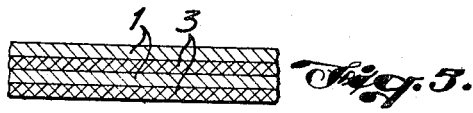
FIG. 5 is a section through a two layer felt.
Figure 6:
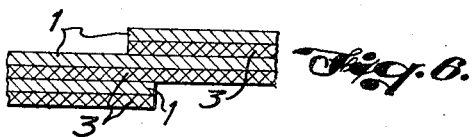
FIG. 6 is a similar section through the joint.
Figure 8:
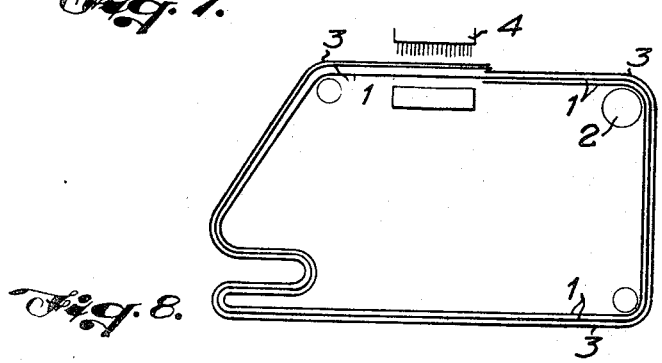
FIG. 8 is a similar view showing a multi-layer felt with a single layer of batt or web.
Figures 9, 10:
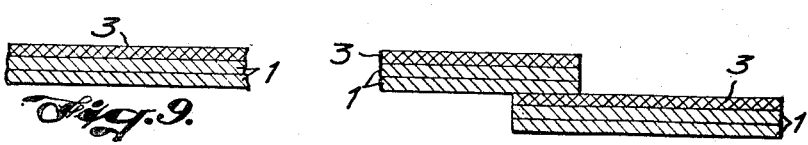
FIG. 9 is a section through a three layer felt.
FIGS. 10 and 11 are similar sections showing two formes of joint.

Alternatively a plurality of layers of warp may be employed (FIG. 8) for the production of a thicker felt or by reducing the thickness or number of threads in the warp a felt of the thickness of FIG. 3 with a less bulky joint.

Since there is no interlacing of warp and weft as in known felts the fabric is more compact and because the warp lies in a substantially straight line there is less tendency for the fabric to stretch in use.

In constructing the felt when the required continuous length of the felt has been needled the starting end is re-entered into the needle loom and needling re-commenced. Thus at this stage a once needled warp and web is being needled together with the ingoing warp with or without additional lightweight web. When two or more layers of warp, which is of course, continuous, are completed, the warp is cut across and the normal web required for the desired surface added to the now endless structure. It will now be understood that an endless non-woven base fabric has now been produced and onto this, on one or both sides, have been needled webs of wool, synthetic or a blend of any material to give the desired requirements and surface of the felt being produced and the final felt may be milled, scoured or receive a known chemical treatment as for woven base felts.

It has been found that two circumferences of warp is sufficient to give the now endless felt all the strength required to withstand the heavy driving load on the Paper/Board machine. It may be preferred in some cases to use a warp of thinner material or of fewer ends or filaments and to make three or more circumferences to form the endless felt. In this way any variation in thickness or permeability at the overlap is considerably reduced. The web of crosslaid fibres may be discontinued after one circumference to still further reduce any disparity in thickness or permeability.

What I claim is:

1. A method for the production of an endless unwoven felt for use in the manufacture of paper and analogous products characterised by feeding a warp and a web of unwoven fibres in superposed relation into a needling loom, needling the web into a predetermined length of the warp to provide an unwoven needle fabric of the required circumference of the felt, reintroducing the leading end of the needled fabric to overlap the trailing end of the warp to product multilayers of warp on the felt, needling the layers of warp into the previously needled fabric and severing the trailing end of the warp when the required strength is achieved.

2. A method for the production of an endless felt as in claim 1 in which the needled fabric is passed a plurality of times through the needling loom, a further warp layer being applied at each passage through the loom.

3. A method for the production of an endless felt as in claim 1 in which a second layer of the web is fed with the second layer of warp to the needling loom.

4. A method for the production of an endless felt as in claim 1 in which the warp is formed in a sheet.

5. A method for the production of an endless felt as in claim 1 in which the web is formed of carded fibres formed into a sheet the width of the warp.

6. A method for the production of an endless felt as in claim 1 in which one layer of the warp is of uncrimped tow and the second layer of the warp of crimped tow.

7. An unwoven endless felt produced by the method claimed in claim 1 characterised in that a plurality of layers of warp and at least one layer of a web are needled together to form a felt of a predetermined circumferential length.

8. The method defined in claim 1, wherein the web is a carded web and the web fibers mainly extend at substantially right angles to the warp threads.

References Cited

UNITED STATES PATENTS

| | | | |
|---|---|---|---|
| 3,086,276 | 4/1963 | Bartz et al. | 28—72.2 X |
| 3,166,823 | 1/1965 | Bernard | 28—72.2 |
| 3,216,082 | 11/1965 | Goy | 28—72.2 |

LOUIS K. RIMRODT, *Primary Examiner.*